March 1, 1932.  V. P. WILLIAMS  1,847,322
SYSTEM OF LUBRICATION
Filed April 2, 1930
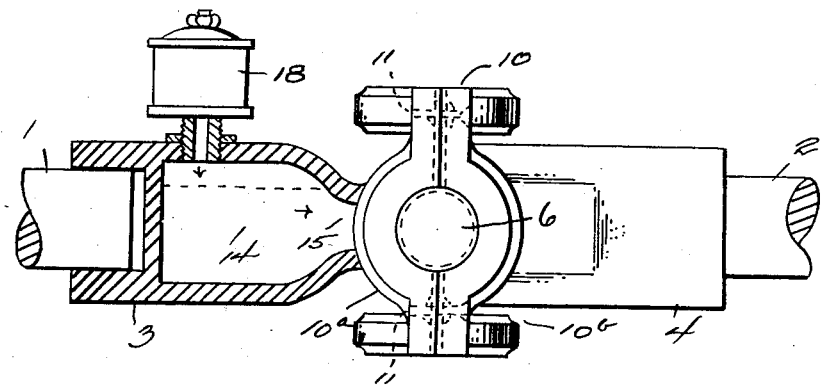
-FIG-1-
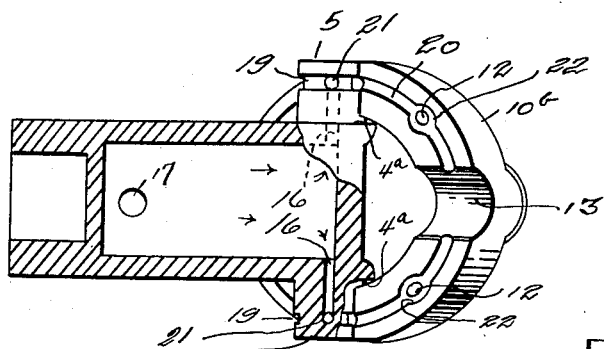
-FIG-2-
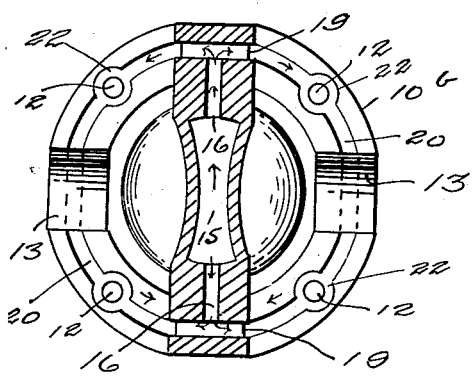
-FIG-3-
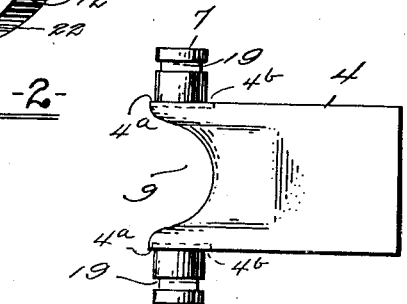
-FIG-4-
Inventor
VILLOR P. WILLIAMS,
By
Attorney Patented Mar. 1, 1932

1,847,322

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

SYSTEM OF LUBRICATION

Application filed April 2, 1930. Serial No. 441,145.

My present invention, in its broad aspect, has reference to improvements in force feed lubrication of rapidly moving or rotating parts, such for instance as the coupling elements of connected shafts; plate couplings; universal joint elements; pin and disk transmission elements, and the like. My present device relates to the subject matter of my copending application Serial #441,146, filed April 2nd, 1930, upon universal joints. More particularly it is my purpose to provide means whereby concealed parts, difficult to properly lubricate, and subject to high friction, may be kept properly lubricated without the use of pumps, splash lubrication, grease cups, or the like, and wherein the lubricating substance is carried to the parts to be lubricated by centrifugal force.

It has been found by experiment that hollow shafting when properly made and proportioned is as strong and has greater rigidity than a solid shaft. One purpose of my invention is to utilize a cavity in a shaft for the storage of lubricating substance such as oil or grease; or in case of a solid shaft of relatively appreciable diameter a part can be slightly enlarged and hollowed out to serve as a lubricant reservoir. In other words, the source of supply of the lubricant in my present invention is carried within a cavity or chamber formed in one of the usual parts of the mechanism. It has also been found in practice that where several parts of a mechanism have a different motion, those parts are difficult to lubricate; for instance when in a unit of mechanism there is a rotating ring coupling receiving pins or stub shafts of other elements which rotate, while the pins slightly oscillate and are whirled radially, it is very difficult to cover all of these parts with the necessary protective film of oil or grease. Such a mechanism is best illustrated by the average universal joint. My invention contemplates receiving lubricant from the reservoir, passing it through lubricating channels formed in the elements themselves, and then feeding the lubricant to the rubbing parts by the force induced by the rotation of those parts—the centrifugal force. In practice my system of lubrication therefor contemplates a central reservoir, lubrication channels from the reservoir generally following a direction radially of the direction of movement of the parts to be lubricated, and a distributing channel coincident with the rotational direction, namely, a circular distributing channel. The advantages of such a system of lubrication may be briefly defined as follows: first, grease cups, pumps, and the like are eliminated; second, the lubricating material or substance is positively fed to the parts by centrifugal force; third, there are no pipe lines or the like to become broken; fourth, entrance of dust and the like to the path of flow of the lubricant is impossible since the lubricant itself is at no time carried in a path outside the mechanism to be lubricated; fifth, space, material and cost is reduced, and the parts lubricated more efficiently; and sixth, all of the elements used in storing and carrying the lubricant are formed in one and the same operation used to fabricate the parts to be lubricated.

Manifestly such a system is subject to considerable modification, especially with reference to the direction and number of lubricating channels, and the size, shape and position of the reservoir, channels and the like; therefore it is emphasized that the right to make such changes is reserved provided they fall within the spirit of my invention as hereinafter described in detail.

In the drawings wherein my system of lubrication is shown in conjunction with the parts of a universal joint:—

Figure 1 is a view of the parts of a universal joint broken away to show the formation of the reservoir for the lubricant, Figure 2 is a perspective view showing the ring and knuckle of a joint and the system of lubrication;

Figure 3 is a face view of the ring, with the knuckle in section to show the reservoir, and Figure 4 is a view of the other knuckle or fork, In the drawings wherein like characters of reference are used throughout the several views to designate like or similar parts:—

The two ends (1) and (2) of the shafts are joined by the elements (3) and (4) of a universal joint; these elements (3) and (4) resemble short or stub shafts and are parts of the knuckles of the joint carrying the pins.

The elements (3) and (4) carry at their ends opposed lateral pins (5) and (6), and (7) and (8) respectively, and the element (4) is curved inwardly or bifurcated at its end, as at (9) to bridge or circle the end of element (3) so that the pins (5), (6), (7) and (8) will be aligned radially from a common axis of rotation to be receivable within the ring (10) and each element (3) and (4) has a shoulder (4a) packed at (4b). The ring (10) is formed of two identical parts (10a) and (10b) held together by bolts or screws (11) passing through registering openings (12), and each half-ring (10a) and (10b) has a semi-circular recess (13) at each of its four quarters, so that when the half rings are put together to form the assembly (10) the four pins will be retained in the openings formed by the recesses (13) with shoulders (4a) riding against the ring; each ring, furthermore, is enlarged at the four quarters to accommodate the recesses (13). This completes the formation of the universal joint. The question solved by my present invention is that of lubricating the working surfaces of the parts heretofore described, and seepage of oil is prevented by the shoulders (4a).

In the element (3) I form a central cavity or chamber (14) which is restricted toward the neck of the knuckle or element (3) as at (15); the walls of element (3) are of sufficient thickness so that the formation of the cavity in no way detracts from its strength and greatly increases the rigidity thereof after known practice. The neck of the cavity or chamber (14) terminates between the two pins (5) and (6) and the pins are centrally bored as at (16) from a point short of the outer ends thereof to the cavity. The cavity is utilized as a reservoir for lubricant which is supplied through the opening (17), and either a grease cup (18) may be used, or the opening (17) may simply be plugged when the cavity is filled with lubricant. The grease cup (18) is not shown as being an essential to my invention, but merely to illustrate a method of filling the cavity with lubricant.

It will be noticed that each pin has an annular groove (19) between its ends, but slightly nearer the outer end. Each half-ring has formed on its inner face an annular groove (20), so that when the half-rings are placed together to form the ring assembly (10) the grooves form a continuous channel; which channel registers with the grooves (19) of the pins (5), (6), (7) and (8). The grooves in pins (5) and (6) communicate with the central bores (16) of the pins through ports (21) so that oil or other lubricant in the reservoir (14) or chamber passes outwardly through bores (16), through ports (21) into grooves (20) in pins (5) and (6), thence into the channel formed by grooves (20) in the half rings, whence the lubricant passes around the ring and into the grooves (20) of the other pins (7) and (8). The path of travel of the lubricant is such that it is distributed to all of the working parts, and since the grooves (20) are intercepted by bolts (11) for retaining the half rings together, a channel is provided to either side of each bolt as indicated at (22).

When the joint is rotated centrifugal force draws the lubricant from the reservoir, out through the pins (5) and (6) and into the channel in the ring so that the feed is forced and it is impossible for the working parts to become dry; they are kept properly lubricated, and accumulation of dust and the like on the parts will not clog the channels or interfere with the distribution of the film of oil on the parts. There are no exposed parts, and the oil cup can be dispensed with if desired. It is only necessary to fill the reservoir with oil at periods of several months or more. My device is therefore automatic, simple in construction, and the channels may be formed in the parts when they are manufactured without appreciably increased cost.

From the foregoing it is believed that the operation of my system of lubrication, and the construction of its parts will be readily understood, but emphasis is again laid upon the fact that the reservoir is formed by a cavity or chamber in the apparatus to be lubricated, and all of the channels for distributing the lubricant are formed directly in the parts without use of pipes or the like, and that the flow is maintained by centrifugal force. While the combination and arrangement of parts heretofore described constitutes the preferred embodiment of my invention, it is desired to again point out that the scope of the invention should only be determined by the claims appended hereunto.

I claim:—

1. A lubricating device for universal joints, comprising a sealed reservoir for lubricant formed by cavitating the integral structure of a hub part of a joint, channels leading off to and from the reservoir in a radial direction, and distributing channels forming a continuous path between the radial channels so that the oil flows continuously to and from the reservoir.

2. A lubricating device for universal joints, comprising a reservoir formed by cavitating one of the integral parts of the joint located substantially at the axis of rotation of the joint, and lead-off channels from the reservoir communicating with a continuous channel for distributing the lubricant to the working parts, the flow in said channels being maintained by centrifugal force.

3. A lubricating device for universal joints, comprising a single sealed reservoir formed by cavitating one of the integral parts of one of the hub elements of the joint located near the axis of rotation of the joint, a distributing channel in a part of the joint removed from the axis of rotation, and a plurality of lead-off channels from the reservoir to the distributing channel; the flow in said lead-off channels and said distributing channel being maintained by centrifugal force.

4. A lubricating device for universal joints, comprising a sealed reservoir formed by cavitating the integral structure of a hub part of the joint, channels in the joint leading too and from the reservoir in a radial direction, and annular distributing means near a circumferential part of the joint and forming a continuous path between the radial channels so that the lubricant flows continuously by centrifugal force to and from the reservoir.

In testimony whereof I affix my signature hereunto.

VILLOR P. WILLIAMS.